US010257150B2

(12) United States Patent
Skeene (10) Patent No.: US 10,257,150 B2
(45) Date of Patent: Apr. 9, 2019

(54) COMMENT LOCK FOR SOCIAL NETWORK MEDIA STREAMING

(71) Applicant: Christopher Keith Skeene, Gravesend (GB)

(72) Inventor: Christopher Keith Skeene, Gravesend (GB)

( * ) Notice: Subject to any disclaimer, the term of this patent is extended or adjusted under 35 U.S.C. 154(b) by 0 days.

(21) Appl. No.: 15/626,599

(22) Filed: Jun. 19, 2017

(65) Prior Publication Data

US 2018/0367494 A1      Dec. 20, 2018

(51) Int. Cl.
*H04L 12/58*        (2006.01)
*G06F 17/24*        (2006.01)

(52) U.S. Cl.
CPC ............ *H04L 51/32* (2013.01); *G06F 17/241* (2013.01); *H04L 51/12* (2013.01)

(58) Field of Classification Search
CPC ......... H04L 51/00–51/32; H04L 67/00–67/02; G06F 17/24–17/241
See application file for complete search history.

(56) References Cited

U.S. PATENT DOCUMENTS

| | | | | |
|---|---|---|---|---|
| 2011/0258545 | A1* | 10/2011 | Hunter .................. | G06Q 10/10 715/716 |
| 2011/0317977 | A1* | 12/2011 | Harris ................... | H04N 5/783 386/200 |
| 2013/0004138 | A1* | 1/2013 | Kilar .................. | H04N 21/4756 386/230 |
| 2017/0308523 | A1* | 10/2017 | Wang ................... | G06F 17/279 |

* cited by examiner

*Primary Examiner* — Clayton R Williams
(74) *Attorney, Agent, or Firm* — James M. Smedley LLC; James Michael Smedley, Esq.

(57)     ABSTRACT

The present invention generally relates to social network media streaming, and to the sharing of comments about the media content by users of the network. In particular, embodiments of the present invention provide a comment lock module that determines and assigns the locking position of a comment to a position within the media stream, e.g. at a particular time code, and restricts viewing of the comment according to its locking position. Thus, a locked comment allows unrestricted viewing access to a user only after the user watched the video past the position that the comment was locked to. The media content may be categorized and/or filtered to allow the user to focus on consuming and sharing primarily positive inspirational content. Specific embodiments provide default and selectable options for determining and assigning the locking position including automatic options by the system, and optionally interactive selectable options provided by the system's GUI that integrates one or more user of the network into determining and assigning the locking position.

19 Claims, 3 Drawing Sheets

COMMENT LOCK FOR SOCIAL NETWORK MEDIA STREAMING

FIELD OF THE INVENTION

The present invention generally relates to social network media streaming, and to the sharing of comments about the media content by users of the network. In particular, embodiments of the present invention provide a comment lock module that determines and assigns the locking position of a comment to a position within the media stream, e.g. at a particular time code, and restricts viewing of the comment according to its locking position. Thus, a locked comment allows unrestricted viewing access to a user only after the user watched the video past the position that the comment was locked to. The media content may be categorized and/or filtered to allow the user to focus on consuming and sharing primarily positive inspirational content. Specific embodiments provide default and selectable options for determining and assigning the locking position including automatic options by the system, and optionally interactive selectable options provided by the system's GUI that integrates one or more user of the network into determining and assigning the locking position.

BACKGROUND OF THE INVENTION

The amount and diversity of media such as movies and other videos available to the general public has grown, and with it the need to discuss such media content with users that have similar interests. Existing forums for such discussions include various social networking sites or services that allow users to post comments with reference to time codes or to posted or linked video snippets as they view a video. To identify videos of interest users might view the comments and then the referenced video. Similarly a user may turn to the comments after watching a video that the user liked or disliked with other users. Either way the options of the current process are cumbersome: the user has to keep one or more time code in mind while watching, or after watching has to go back and find the correct point in time corresponding to the time code of the referenced clip, or has to stop watching the main video and refer to a link or to a posted excerpt of the video.

Another drawback of present options is related to the timing of comment consumption, especially if comments are provided without spoiler alerts. Reading comments before watching a corresponding video (e.g. to identify one of particular interest) can spoil its enjoyment by prematurely revealing critical information, e.g. a major twist in the storyline such as the death or survival of a main character, how a mystery resolves, or similar. The only current option to securely avoid this problem is to postpone reading of all comments until after the video has been watched to its end, in which case comments cannot safely be used to identify videos of interest beforehand. Similarly, rather than allowing a user to be sociable and discuss a video and reactions to it with fellow users during the experience in real time, the user has to wait to avoid exposure to "spoiler" comments, and to avoid making such comments.

Therefore, there is a need in the art for a system and method that allows users to more freely share their comments and experience with others while ensuring that the viewing experience is not significantly altered by prematurely revealing relevant information. Additionally, there is a need for a system and method that allow a comment sharing experience that is less cumbersome and more immediate. Further there is a need for an enriched interactive experience viewing a media stream where users can enjoy access to multiple user comments presented concurrently with the media stream. These and other features and advantages of the present invention will be explained and will become apparent to one of ordinary skill in the art through the summary of the invention that follows.

SUMMARY OF THE INVENTION

The present invention generally relates to social network media streaming, and to the sharing of comments about the media content by users of the network. In particular, embodiments of the present invention provide a comment lock module that automatically determines and assigns a locking position for a comment to a position within the media stream, and may restrict viewing of the comment content until a watching user has passed the locking position.

According to an embodiment of the present invention, provided is a system for locking social network user comments to positions in a media stream, the system comprising the following system components: a network server configured to stream media to a plurality of client computing devices; a client computing device which comprises a graphical user interface (GUI) configured to allow a user to communicate with the network server; a data store configured to store user data, user comments and comment-related data; a communications means configured to allow exchange of data between server and client computing device; and a comment lock module configured to determine and assign a locking position to each comment; wherein the system components are operably connected and are configured to: providing a media stream to a plurality of users; receive a comment from one or more user at a specific position of the media stream; automatically tag each comment to its corresponding position within the media stream; automatically determine and assign a locking position for each comment; automatically generate a comment indication for users watching the media stream that indicates that a comment is tagged to a position in the media stream, the comment indication optionally comprising a locking indication; automatically determine whether the watching user's current or past position in the media stream has passed the locking position for a comment; automatically restrict the viewing of the comment's content until the locking position is passed by the watching user; provide the watching user with one or more option for unrestricted viewing of the comment once the watching user has passed the locking position.

According to an embodiment of the present invention, provided is a system wherein the comment lock module's determination and assignment of the locking position comprises an automatic evaluation of the comment content.

According to an embodiment of the present invention, provided is a system wherein the automatic evaluation of the comment content comprises comparing keywords in the comment content with keyword categories in the data store.

According to an embodiment of the present invention, provided is a system wherein the GUI comprises selectable options for a user to restrict comment notifications while consuming a media stream to one or more options, the options including no notifications, notifications from one or more selected individual user, and notifications from one or more group of users.

According to an embodiment of the present invention, provided is a system wherein the content is filtered based on content categories or content similarities to content of positive categories, and wherein the positive categories one or more of Love, Inspirational, Hope, Laughter, and Gratitude.

According to an embodiment of the present invention, provided is a system wherein the GUI comprises one or more option for a user to send a link or attached file of a media stream item or content thereof to another user, and the link or file optionally is selected from a filtered category option that comprises Love, Inspirational, Hope, Laughter, and Gratitude.

According to an embodiment of the present invention, provided is a system which further comprises an AI module, and wherein the automatic evaluation of the comment content comprises evaluation of the comment content by the AI module.

According to an embodiment of the present invention, provided is a system wherein the automatic evaluation of the comment content comprises the entry of the locking position or locking position related data by of one or more individual, the individual selected from the group comprising: commenting user, user, group of users, group of users selected by profile characteristics, group of users with comment lock privileges, moderator, forum moderator, administrator.

According to an embodiment of the present invention, provided is a system wherein the GUI is configured to provide the individual with selectable options to indicate the position that a comment should be locked to.

According to an embodiment of the present invention, provided is a system wherein the GUI comprises a navigation tool configured with user-selectable options for navigating to and between comment tags and comment locking positions within the data stream.

According to an embodiment of the present invention, provided is a system wherein the GUI comprises a navigation tool configured to allow a user to jump to the positions in the media stream to which a comment is tagged to or to its locking position, and upon selection of the comment, display the comment and optionally the media stream starting from the tagged position or the locking position.

According to an embodiment of the present invention, provided is a computer-implemented method for locking social network user comments to positions in a media stream, wherein each step of the method is performed by a system of operably connected components, and wherein the system components comprise: a network server configured to stream media to a plurality of client computing devices; a client computing device which comprises a graphical user interface (GUI) configured to allow a user to communicate with the network server; a data store configured to store user data, user comments and comment-related data; a communications means configured to allow exchange of data between server and client computing device; and a comment lock module configured to determine and assign a locking position to each comment; and wherein the method steps comprise: providing a media stream to a plurality of users; receiving a comment from one or more user at a specific position of the media stream; automatically tagging each comment to its corresponding position within the media stream; automatically determining and assigning a locking position for each comment; automatically generating a comment indication for users watching the media stream that indicates that a comment is tagged to a position in the media stream, the comment indication optionally comprising a locking indication; automatically determining whether the watching user's current or past position in the media stream has passed the locking position for a comment; automatically restricting the viewing of the comment's content until the locking position is passed by the watching user; providing the watching user with one or more option for unrestricted viewing of the comment once the watching user has passed the locking position.

According to an embodiment of the present invention, provided is a computer-implemented method wherein determining and assigning of the locking position comprises an automatic evaluation of the comment content by the comment lock module.

According to an embodiment of the present invention, provided is a computer-implemented method wherein the automatic evaluation of the comment content comprises comparing keywords in the comment content with keyword categories in the data store.

According to an embodiment of the present invention, provided is a computer-implemented method wherein the system further comprises an AI module, and the automatic evaluation of the comment content comprises evaluation of the comment content by the AI module.

According to an embodiment of the present invention, provided is a computer-implemented method wherein the automatic evaluation of the comment content comprises the entry of the locking position or locking position related data by of one or more individual, the individual selected from the group comprising: commenting user, user, group of users, group of users selected by profile characteristics, group of users with comment lock privileges, moderator, forum moderator, administrator.

According to an embodiment of the present invention, provided is a computer-implemented method wherein the GUI comprises selectable options for a user to restrict comment notifications while consuming a media stream to one or more options, the options including no notifications, notifications from one or more individual user, and notifications from one or more group of users.

According to an embodiment of the present invention, provided is a computer-implemented method wherein the content is filtered based on content categories or content similarities to content of positive categories, and wherein the positive categories one or more of Love, Inspirational, Hope, Laughter, and Gratitude.

According to an embodiment of the present invention, provided is a computer-implemented method wherein the GUI comprises one or more option for a user to send a link or attached file of a media stream item or content thereof to another user, and the link or file optionally is selected from a filtered category option that comprises Love, Inspirational, Hope, Laughter, and Gratitude.

According to an embodiment of the present invention, provided is a computer-implemented method wherein the method further comprises the step of providing an individual with selectable options to indicate the position that a comment should be locked to by the GUI of the system.

According to an embodiment of the present invention, provided is a computer-implemented method wherein the method further comprises the step of providing a user with a navigation tool configured with user-selectable options for navigating to and between comment tags and comment locking positions within the data stream.

According to an embodiment of the present invention, provided is a computer-implemented method wherein the method further comprises the step of providing a navigation tool configured to allow a user to jump to the positions in the media stream to which a comment is tagged to or to its locking position, and upon selection of the comment, displaying the comment and optionally the media stream starting from the tagged position or the locking position.

The foregoing summary of the present invention with the preferred embodiments should not be construed to limit the scope of the invention. As will be apparent to a person of ordinary skill in the art, the embodiments of the invention as described may be further modified without departing from the spirit and scope of the invention.

DETAILED DESCRIPTION OF THE INVENTION

The present invention generally relates to social network media streaming, and to the sharing of comments about the media content by users of the network. In particular, embodiments of the present invention provide a comment lock module that determines and assigns the locking position of a comment to a position within the media stream, e.g. at a particular time code, and restricts viewing of the comment according to its locking position. Thus, a locked comment allows unrestricted viewing access to a user only after the user watched the video past the position that the comment was locked to. Specific embodiments provide default and selectable options for determining and assigning the locking position including automatic options by the system, and optionally interactive selectable options provided by the system's GUI that integrates one or more user of the network into determining and assigning the locking position.

According to an embodiment of the present invention, a media stream may include video or audio or both. Video and audio are time-based media storage formats. Video is comprised of a sequence of images, typically with at least one audio channel. Audio may comprise one or more sound/music track, typically including a master track. Examples include live or recorded video/audio, e.g. a movie or song, TV show/series, live TV broadcast, music video, and live radio transmission. Audio and video digital recordings (also known as audio and video codecs), can be uncompressed, lossless compressed, or lossy compressed depending on the desired quality and use.

According to an embodiment of the present invention, comments typically are text, which may be typed or entered as a voice message by a user of the network via the system's graphical user interface (GUI). Alternatively or additionally, comments may be in form of generally short voice/sound or video messages. Additionally or alternatively, a GUI may provide certain symbolic buttons or emojis to indicate a rating (number of stars, flags or similar), a degree of liking or disliking (thumbs up/down, like/dislike), and/or a particular emotional reaction (smile, sad, furious, etc.).

According to an embodiment of the present invention, user comments may be tagged to a specific position within a media stream. The position may be a particular time code and its instances may comprise units of seconds, minutes, or hours counted up from a start time at 0. Alternatively the position may be defined other convenient sequential units, or by segments of different lengths. Individual segments may be defined e.g. by one or more of start time, end time, duration, and/or their neighboring segments. Positions at particular time codes (or within particular segments) may be associated with a particular event, screen shot, image or symbol that may be displayed by the GUI as a visual representation for navigation, and preferably includes links that when selected or clicked take the user to the relevant position. The visual representation may provide a condensed version or summary of the media stream, for example a sequence of key events and/or events heavily commented on, represented by screenshots or other visual or textual representation, or a combination thereof.

According to an embodiment of the present invention, a user comment that is tagged to one or more position within the media stream, in addition to the comment itself, may include, may or link to, related data that is related to the comment and/or the user, such as the date and time that the comment was made, name of the user, user avatar, user status at the time the comment was made, current user status, and other user characteristics or statistics, such as gender, age, number of comments made, number of media streams commented one, etc. The GUI of the system may be configured to provide the user with selectable options to display one or more item of related data, or a combination or overview thereof.

According to an embodiment of the present invention, a comment lock module is configured to determine and assign a locking position to a user comment, and restrict viewing of the comment according to a user's position in watching the media stream. A locking position at the start of a media stream (e.g. time code "0", or first of a plurality of segments) allows unrestricted viewing by all users, independent of their position within a media stream that a user is watching or has watched in the past. For all locking positions within the media stream, viewing restrictions are determined based on a user's position in relation to the locking position, and a user is required to reach the locking position within the media stream before being allowed unrestricted view. If the locking position is at the end of a media stream, a user is required to reach the end of the media stream for unrestricted view of the comment.

According to an embodiment of the present invention, the media stream relevant for the comment lock module to determine restricted or unrestricted viewing may be a user's currently active media stream, or alternatively may include a watching history stored by the system, e.g. in a user's profile or other user-associated data store of the system.

According to an embodiment of the present invention, the comment lock module may be configured to determine the locking position based on one or more of the position in the media stream to which the comment is tagged to (i.e. at which it was entered by the commenting user), the commenting user's selection or entry of a locking position, selections or entries of one or more other user or group of users of a locking position, and the comment content.

According to an embodiment of the present invention, the system may be configured to preliminarily assign a default locking position to each newly entered comment before determining the actual locking position. For example, the default locking position may be chosen from the position at the end of the media stream (i.e. corresponding to restricted viewing of content until the end of the media stream is reached by the user), the position the comment was tagged to, or an entry by the commenting user.

According to an embodiment of the present invention, the system may be configured to provide for the entry of the locking position by the commenting user, and may optionally be configured for automatic review by one or more other users or groups of users. Such users or groups may include, for example, administrator(s), users with particular characteristics or minimum requirements such as membership duration, number of comments made, number of entered locking positions later changed by other users, particular comment lock privileges. The commenting user's entry of the locking position and the automatic review by other users may be configured in form of a GUI that automatically provides selectable options for user participation configured to determine an appropriate locking position.

According to an embodiment of the present invention, the GUI may be configured with restrictions with regard to the number of comments a user can post or tag, e.g. within a single media stream item, type of media stream items, or per unit of time. For example, a user may have a limited comment budget per media item (e.g. per particular movie), and/or a hourly, daily, weekly or monthly comment budget. For example, a user may be allowed up to 2, 5, 10, 20, 25 comments per media item, and/or up to 5, 10, 20, 30, 40, 50, 100, 250, 500 or 1000 comments per hour, day, week or month. The comment budget may differ depending on type of media item, e.g. for shorter series up to 5, 10, or 15 comments may be budgeted per user, and for movies, 10, 20, or 30 comments may be budgeted. Alternatively or additionally, the comment budget may differ depending on group of users, e.g. users may earn an increased comment budget by making comments that receive high ratings from other users (e.g. ratings may include ratings on a scale, such as 1-5, or number of starts, or may include certain tags that can be added, e.g. "thoughtful", "inspiring", etc.). The system via its GUI may assign a comment budget to each user depending an the group that a user belongs to and/or the ratings the user received for posting/tagging comments, and display a user's comment budget and/or the total comments, or an average over time, e.g. in a user's public profile or as part of a user's avatar/symbolic visual representation.

According to an embodiment of the present invention, the GUI may be configured with selectable options, for example, to allow a user to enter a locking position for an existing comment (or to enter an alternative position for an existing one), to choose (or confirm) one of several suggested locking positions from a menu, to flag one or more entered position for further review. Selectable options may include "confirm existing position", "override existing position" "no restrictions/lock to start", "fully restricted/lock to end", and one or more "lock to a particular position" options. Preferably, the GUI provides the users with a navigation tool to easily determine an appropriate locking position from a list, preferably a visually enhanced list with symbols or screenshots, representing the media stream. More preferably the navigation tools includes links to relevant locations, and a copy tool for automatically inserting the relevant position entry without typing.

According to an embodiment of the present invention, the comment lock module may be configured to provide users or groups of users with particular locking privileges, and may grant certain users or groups override privileges to change locking positions entered by commenting users without equivalent privileges. The override function may be configured to require an entry by one or more user with a particular privilege, and/or entries by a minimum number of a plurality of users having particular privileges. Alternatively or additionally, confirmation by certain users/groups may be required (e.g. by an administrator or user with moderator rights for all or a relevant part of a particular forum within the social network that hosts the media stream).

According to an embodiment of the present invention, the system may be configured to determine the final locking position of a comment from the total of all current user entries by an appropriate algorithm, for example, by choosing the earliest of all locking positions in the media stream that were entered, the earliest that occurred at a required minimum percentage of users (e.g. at least 10, 20, 25, 30, 40 or 50% of total entries). The system may be configured to continually review and adjust the determination of the locking position, or to run the determination according to certain predetermined criteria, e.g. to run the determination for a particular amount of time, until a particular amount of entries were made, until a particular statistical distribution is reached (e.g. bell curve), or to repeat individual runs of the determination according to a particular schedule (once an hour, day, week, etc.).

According to an embodiment of the present invention, the system may be configured by automatic functions of the system which may optionally employ machine learning, for example an Artificial Intelligence (AI) module such as Apple's Siri or similar.

According to an embodiment of the present invention, the comment lock module may be configured to automatically determine the locking position based on the comment content, for example based on the presence or absence of key words in the comment content, optionally in context of all or part of the remaining comment content and presence or absence of other keywords/a set of keywords. The keywords/set of keywords may be specific for the media stream, e.g. a particular movie that is commented on, or may be specific to a category that includes a plurality of individual media stream items. The keywords may be stored in the comment lock module itself, or in a system component that comprises a data store and is communicatively connected to the comment lock module.

According to an embodiment of the present invention, the keywords/set of keywords and related rules used for automatic determination and assignment of a locking position may be edited by an individual, e.g. an administrator, designated user or group of users, or may be changed by an Artificial intelligence (AI) module of the system. Such systems may learn supervised, semi-supervised or unsupervised, and may refer to existing libraries of keywords, expressions, and categories, or may build their own. AIs may learn from existing comments, from their context in the remaining comment content, from reactions (flagging and comments) of other users, from the location of the comment in a media stream, and from other related or unrelated comments or responses. The AI module may be configured for interaction with a user or group of users of the network to improve correctly determining and assigning the locking position of comments.

According to an embodiment of the present invention, the user comments may be machine-read by the AI module with the objective to determine the locking position.

According to an embodiment of the present invention, keyword processing or comment reading to determine the locking position may be performed by an AI module of the system. A number of different AIs, and in particular AIs for natural language processing and natural language understanding, and specifically for the processes of disassembling and parsing, are known in the art. Particularly suitable are AIs that employ deep machine learning techniques, for example deep neural networks (DNN), convolutional deep neural networks (CNN), deep belief networks and recurrent neural networks (RNN). Recurrent neural networks, especially Long Short-Term Memory (LSTM) networks, are appropriate for sequential data such as language. LSTM combined with CNNs may be used for automatic image captioning, e.g. to cross-reference images at the position a comment is placed for further context. Typical components of an AI module include a lexicon of the relevant language(s), a parser, grammar rules to break sentences into an internal representation, and a lexicon that may be based on an existing one and added to. An existing lexicon is the Wordnet lexicon. The AI module also needs a semantic theory to guide the comprehension, and interpretation capabilities of a language understanding system depend on the semantic theory that is used. For example, pragmatics derive meaning from context. Logical inference can be integrated within the AI framework, e.g. by mapping the derived meaning into a set of assertions in predicate logic, then using logical deduction to arrive at conclusions.

According to an embodiment of the present invention, the GUI may indicate the presence of one or more comments, and optionally their type, to a user selecting or watching a media stream. The GUI may be configured to provide a comment indicator which may appear in a list of media streams, e.g. a list ordered by certain categories (by date, most recent, suggestions, by genre, by actor, etc.), a user feed, or a list according to a user's filter settings or search results. In addition or alternatively, the comment indications may appear in the media stream itself. For example, the GUI may provide for different symbols that indicate the presence of different types of comments to a user while watching a particular media stream, e.g. a symbol to represent a text comment, a second symbol to represent a voice comment (with optional automatic text transcription), a third symbol for a video comment, and so forth. The comment indicator may be provided anywhere in the viewing area of the media stream, e.g. in an upper or lower, right or left corner thereof.

According to an embodiment of the present invention, the GUI of the system may be configured to provide the user with a navigation tool to navigate between sequential positions in a media stream to leave a comment, or to view comments tagged to a position within the media stream. For example, the user may choose to view the media stream either from the start or from any point within, e.g. a point where a comment was made. The GUI may additionally be configured with navigation elements such as action buttons, clickable menus (optionally with submenus), scroll bars, time lines with links to tags, flags or similar navigational elements, and links to one or more following comment, to navigate within a media stream and within its comments. For example, a user may navigate forward or backward between comments, back to the user's previous position in the media stream (e.g. "forward/backward" and "home" or "return" buttons), and other positions of interest, e.g. start and end, and positions corresponding to key events.

According to an embodiment of the present invention, when viewing is restricted for a user, the system's GUI may provide the user with a navigation tools for saving and later viewing locked comments, e.g. a symbol button to indicate presence of a comment to be returned to later (optionally with a selectable option to save to a particular list), and/or may provide for viewing one or more item of related data (e.g. name of user who made the comment, date the comment was entered, time code that the comment refers to, status and/or statistics of the user who made the comment, etc.). Thus a user may save comments to return to, based on information about the comment, the commenting user and related statistics; for example, a user could save recent comments made by friends, favorites or users they follow. The GUI may similarly provide a user with selectable options to customize the user profile for saving comments to a particular list based on the above and other characteristics of comment and commenting user (e.g. automatically save all comments made within a certain number of hours/days/week/weeks etc. by any user who is on the watching user's favorite or followed list).

According to an embodiment of the present invention, multiple comments may be grouped at particular positions or within particular segments, and the system may provide a GUI to sort and filter comments for easy viewing by a user. The system may provide a GUI that may display one or more grouping based on user-selectable options based on comment-related parameters, including e.g. the number and content of comments. For example, if a few short comments are received, all may be shown in their entirety, either directly in a dedicated comment section of the screen, or after clicking a comment symbol that opens or switches to a dedicated comment section. If numerous comments are received at or near a particular position, the system may order them by default or offer one or more selectable options to allow the user to participate in sorting or filtering comments by characteristics relating to the comment (user identity, user characteristic, length of comment, time the comment was made, key words the comment contains, number of times that the comment was liked, comments by certain users/favorite users displayed on top, etc.). For example, the GUI may provide a short summary line in a list of comments, or symbols/emojis relating to one or more category that relate to the comment characteristics.

According to an embodiment of the present invention, alternatively or additionally to the comment indicator, a dedicated comment section may be provided by the GUI that indicates the number and type of comments for a current time code or segment, or a current time code and a particular time afterwards, for example 0.5, 1, 2, 3, 4, 5, 6, 7, 8, 9, 10, 15, 20, 25 or 30 minutes. Optionally, the dedicated comment section may provide a partial view of each comment, or in case of a plurality of comments, a list with a partial view, e.g. the first 1, 2, 3, 4 or 5 lines or a comment. The system may be configured to select the amount of comment shown in its GUI based on the available space to allow all comments to be shown, or to maximize the number of comments shown in the dedicated section. The dedicated comment section may be provided with multiple pages and a button to switch to the next page, and/or a scroll bar to move within the list shown. Alternatively to a list, the comments may be shown as a panel. Optionally, the dedicated comment section may be configured to provide related data, and may be configured with selectable options for the user to choose which data is shown.

According to an embodiment of the present invention, the GUI of the system may be configured to provide a new comment notification to a watching user to inform about the addition of one or more comment tagged within a media stream selected by the user that was newly added since the user started watching the media stream. The system may be configured to allow the user to pause and view the unrestricted comment(s), and may provide the user with the option to add the user's reaction or response to the new comment. If the comment is tagged to a specific position, the comment lock module may restrict viewing of the comment to the user until the watching user's media stream has passed the specific position, at which point the comment will be unrestricted to the user who will be provided with a notification and option to view the comment.

According to an embodiment of the present invention, the system may be configured with selectable options to notify a user about all additional "new" comments (but only allow unrestricted viewing depending on the watching user's position in the media stream), or alternatively to notify a user only about comments that allow unrestricted viewing based on the position of the user in the media stream. Once the locking position of a comment is passed and the comment becomes unrestricted to the watching user, the system may be configured to automatically notify the user about the new comment.

According to an embodiment of the present invention, new comment notifications of the GUI may take any form, for example they may be pop-up messages, symbols, counters that indicate additional comments by an increase of the number shown. Alternatively the new comment notification may show up in a dedicated comment section of a display, e.g. as part of a comment list or panel. The system may be configured to provide selectable options to the user to customize the dedicated comment section and how comments and new comment notifications are shown. For example, new comments may show up at the top of a list or panel, the middle of the screen, or a particular corner of the screen. Preferably, notifications be color-coded to attract the user's attention, and optionally may change color or blink. The GUI may be configured to provide the user with selectable options to customize new comment notifications with regard to type (pop-up, symbol, addition to list in comment section, visual appearance and notification frequency), may provide the user with a selectable option to turn notifications on or off, for example an action button, may provide the user with menu selections or selectable options to limit notifications depending on their characteristics, including in particular the source of a comment. For example, the user may designate specific users or groups of users to receive comment notifications of, or may designate certain characteristics of these users. A button may be provided to restrict comment notifications to one or more individual user or to one or more group or list which may be defined or pre-selected by the user, e.g. one, two, three, etc. particular users, or the user's favorites or friends. The GUI may preferably provide the above selectable comment notification options during consumption of a media stream, e.g. while watching a movie or video or listening to a song.

According to an embodiment of the present invention, the media content may be categorized and/or filtered to allow the user to focus on consuming and sharing primarily positive inspirational content. For example, the media stream items or content may be pre-selected or monitored by one or more of a moderator/administrator, the system/the system's AI or algorithms configured to restrict content. For example, media stream items or content may be automatically categorized into positive and negative/restricted according to their similarity to pre-defined content, and/or the user's reactions or reviews, and/or may be automatically filtered with non-positive or negative content restricted, e.g. not present or accessible on the site, or not present/accessible in certain categories.

According to an embodiment of the present invention, user comments and comment notifications of the GUI may comprise a link or file attachment to a media stream item or content that is configured to be opened by one or more recipient. Alternatively or additionally, the GUI may comprise a send feature, preferably a button, or tab, to send one or more media stream item (movie, film, video, audio, etc.), or partial content thereof. The GUI's send feature may include input fields for the sending user to input the receiving user's address information (e.g. by selecting from a list, or typing a screen name/system name) to direct the transmission to the relevant recipient. These features may allow users to transmit or share media stream items or content and send suggestions that can be immediately accessed by the recipient. The GUI may be configured with sending options associated with a plurality of categories, preferably positive categories (Send Inspiration, Send Love, Send Hope, Send Laughter, Send Smiles, Send Giggles, Send Gratitude, Send Survival, Send Healing, Send Relaxation, Send Calm, Send Good Vibes, Send Spice, etc.), and may include suggestions based on the sending and/or receiving user's profile. For example, a user who wants to activate the "Send Love" option could select from love movies or love songs that, based on the receiving user's profile and preferences, were not consumed before but would have a high probability to be liked. The selection of categories may be made by one or more moderator, a system AI module configured to select preferred media stream items or content, and/or may be based on one or more probability algorithm configured in the system.

According to an embodiment of the present invention, the system may be configured with headings, tabs, menu sections, and/or subsections that reflect the positive content of the site. For example, Inspirational, Love, Hope, Humor, Laughter, Smiles, Giggles, Gratitude, Survival, Healing, Relaxation, Calm, Good Vibes, Spice, Nature, etc. These headings may e.g. replace the typical genre categories (Thriller, Comedy, Drama, etc.)

According to an embodiment of the present invention, the system may be configured to provide a commenting user with a list of main events and corresponding time codes in the media stream. The list may be scrollable and have other navigation means that facilitate finding and entering a particular time code, including e.g. an option that corresponds to the time code when the comment was made. The list may show the time code corresponding to the time the comment was made as a default, and allow navigation to other positions within the media stream, either by time code or within summary segments or similar. Alternatively or additionally, the GUI may provide a selectable option to enter a time code manually, or may provide a search option. The search option may include selectable options to search in a summary or in certain segments or in the whole media stream. The search may be performed by text (for example text of comments entered by commenting users, or text associated with segments), or may be performed based on images (e.g. appearance of certain characters, objects, locations, landmarks, cities).

According to an embodiment of the present invention, the media stream provided to the user by the system may be received on any suitable computing device that can receive and display the media stream, or receive the data stream and transfer it to a display device. Non-limiting examples include a laptop computer, a desktop computer, a tablet computer, a mobile telephone, a personal digital assistant (PDA), a mobile email device, a portable game console, a television with one or more processors embedded in the television or coupled to it, or any other electronic device capable of accessing a network via a communication means.

According to an embodiment of the present invention, input of a comment by a user can be by any convenient means, as will be apparent to a person of ordinary skill. For example, the comment may be entered via instant message, a text message to a cell phone, a message posting to an online bulletin board provided by the system, or similar.

Embodiments of the present invention may employ well known media streaming technology. Media streaming is based on a server-client technology to play e.g. video immediately as it is received from the Internet (as opposed to storing it in a file on the receiving computer first). Clients may include web browser plug-ins or special stand-alone applications such as a media player. Typically, a compression method (also known as Codec) is used to compress data, which is decompresses upon receipts by computing device of the user watching the media stream. Decompressing preferably is configured for real time compression, requiring a sufficiently fast computing device.

In embodiments of the present invention, for transmission of the media stream, various transport protocols well known in the art may be used. Typically, transport protocols specialized for network streaming applications will be used, in particular, Transmission Control Protocols (TCP). Illustrative examples of streaming protocols suitable for streaming media over networks include: Real-time Streaming Protocol (RTSP), Real-time Transport Protocol (or RTP), Real-time Transport Control Protocol (RTCP), Real Data Transport (RDT, optionally with the control protocol RTSP). While not a streaming protocol, HTTP may be used to distribute small files such as podcasts and comments made on videos, e.g. including video comments.

In embodiments of the present invention, media streams such as audio, video or combined audio and video streams may use various suitable formats well known in the art. For example, an audio stream may use an audio coding format such as e.g. MP3, Vorbis, AAC or Opus. Video coding formats for video streams may include H.264, HEVC, VP8 or VP9. Encoded audio and video streams may be assembled in a container "bitstream" such as e.g. MP4, FLV, WebM, ASF or ISMA. The bitstream may be delivered from a streaming server to a streaming client (e.g., the user's internet-connected laptop) using a transport protocol, such as Adobe's RTMP or RTP.

In embodiments of the present invention, alternatively to the above protocols, technologies that enable adaptive bitrate streaming over HTTP may be used, e.g. Apple's HLS, Microsoft's Smooth Streaming, Adobe's HDS and non-proprietary formats such as MPEG-DASH. For example, a non-HTTP-based specialized streaming transport protocol may be used to send video from a live venue to a cloud transcoding service and CDN, which may then use a HTTP-based transport protocols to distribute the video to individual users. The streaming client/user may interact with the streaming server using a control protocol, for example MMS or RTSP.

In embodiments of the present invention, protocols for media streams may be unicast protocols that send a separate copy to each user, or multicast protocols that distribute the same copy to multiple users, depending on the network infrastructure and type. To still allow the user to control playback in a multicast protocol, caching servers, digital set-top boxes, and/or buffered media players may be used. Alternatively or additionally, IP multicast or peer-to-peer (P2P) protocols may be used.

In embodiments of the present invention, various existing media streamlining systems may be used, as will be apparent to a person of ordinary skill. Illustrative examples of suitable media streaming systems include: Adobe Flash Media Server, Cameleon by Yatko, Darwin Streaming Server by Apple, Feng by LSCube, Helix DNA Server and Helix Universal Server by RealNetworks, IIS Media Services by Microsoft, Nimble Streamer by WMS Panel, Open Broadcaster by Open Broadcaster, QuickTime Streaming Server (QTSS), Unreal Media Server by Unreal Streaming Technologies, Wowza Streaming Engine by Wowza Media Systems, and many more.

Figure 1:
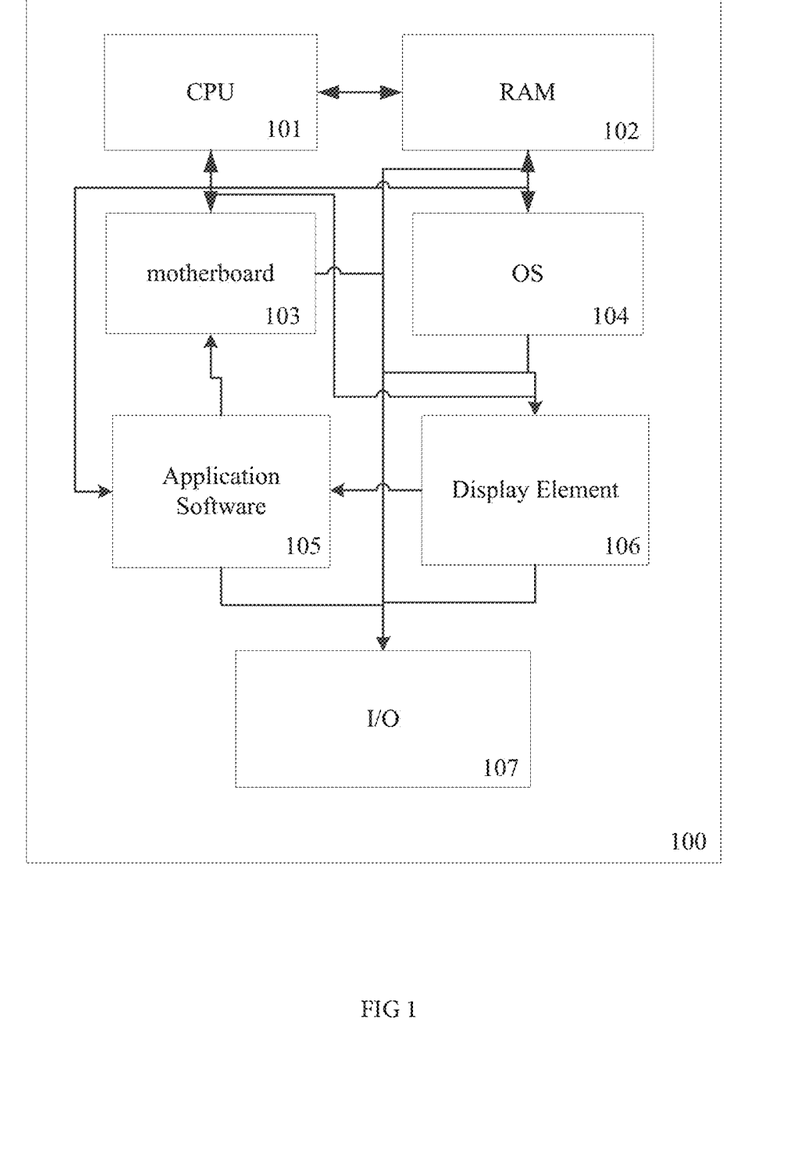
FIG. 1 illustrates a schematic overview of a computing device for use in methods and systems in accordance with embodiments of the present invention.

According to an embodiment of the present invention, the system and method is accomplished through the use of one or more computing devices. As shown in FIG. 1, One of ordinary skill in the art would appreciate that a computing device 100 appropriate for use with embodiments of the present application may generally be comprised of one or more of a Central processing Unit (CPU) 101, Random Access Memory (RAM) 102, a storage medium (e.g., hard disk drive, solid state drive, flash memory, cloud storage) and mother board 103, an operating system (OS) 104, one or more application software 105, display element 106 and one or more input/output devices/means 107. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

In an exemplary embodiment according to the present invention, data may be provided to the system, stored by the system and/or provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 2:
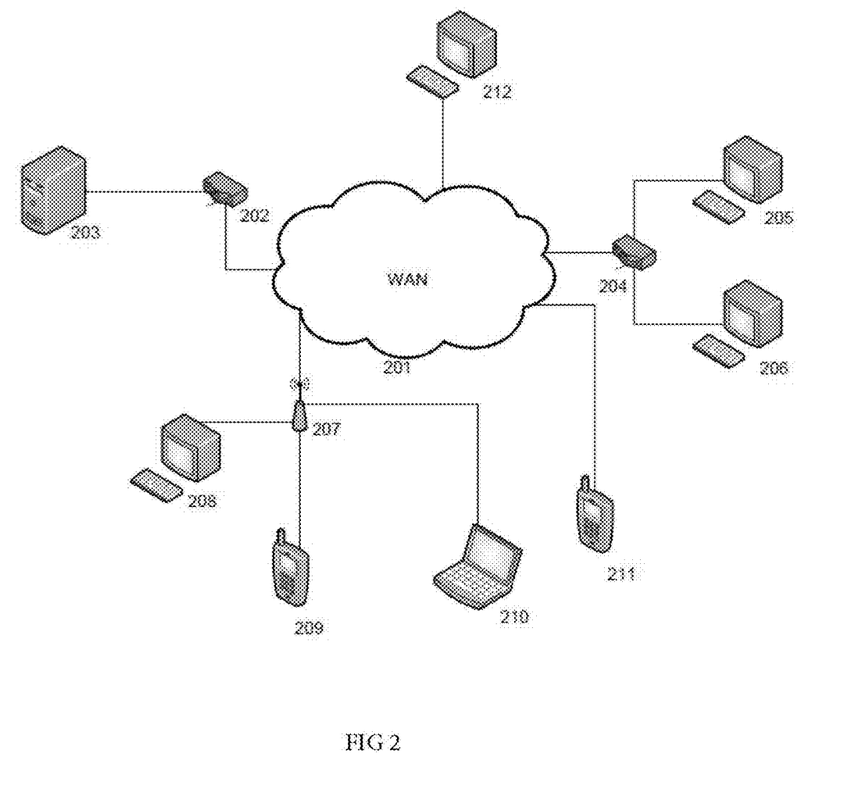
FIG. 2 illustrates a schematic overview of a network for use in methods and systems in accordance with embodiments of the present invention.

Referring to FIG. 2, a schematic overview of a system in accordance with an embodiment of the present invention is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 2, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present invention may or may not utilize one or more routers 202. One of ordinary skill in the art would appreciate that there are numerous ways server 203 may connect to WAN 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via WAN 201 or other network in numerous ways. For instance, a component may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art would appreciate that there are numerous ways that a component may connect to server 203 via WAN 201 or other network, and embodiments of the present invention are contemplated for use with any method for connecting to server 203 via WAN 201 or other network. Furthermore, server 203 could be comprised of a personal computing device, such as a smartphone, acting as a host for other computing devices to connect to.

According to an embodiment of the present invention, the communications means of the system may be, for instance, any means for communicating data, voice or video communications over one or more networks or to one or more peripheral devices attached to the system. Appropriate communications means may include, but are not limited to, wireless connections, wired connections, cellular connections, data port connections, Bluetooth® connections, or any combination thereof. One of ordinary skill in the art would appreciate that there are numerous communications means that may be utilized with embodiments of the present invention, and embodiments of the present invention are contemplated for use with any communications means.

Exemplary Embodiments

Turning now to FIG. 1, a schematic overview of a computing device for use in methods and systems in accordance with embodiments of the present invention is shown. Typical components of a computing device that may be used in embodiments of the present invention are illustrated;

In FIG. 2, a schematic overview of a network for use in methods and systems in accordance with embodiments of the present invention is shown. Typical network components that may be used in embodiments of the present invention are illustrated.

Figure 3:
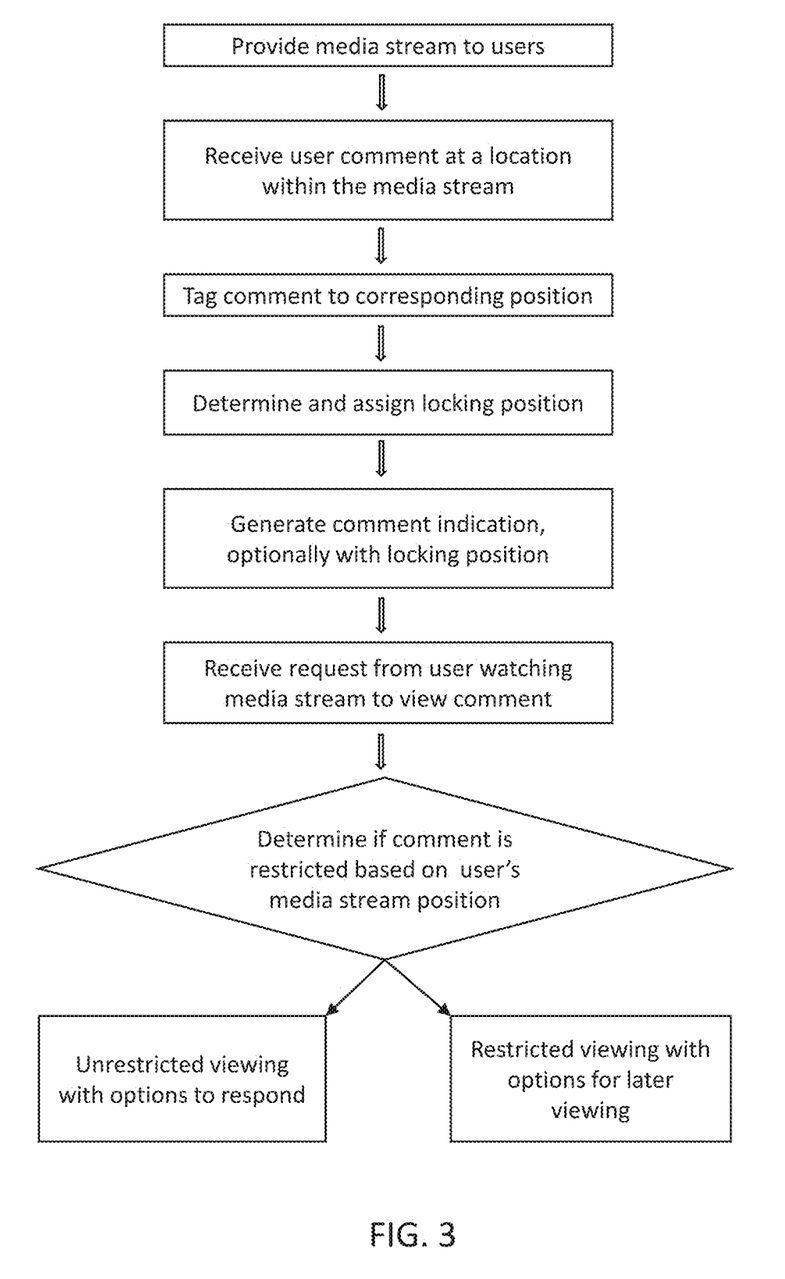
FIG. 3 illustrates a schematic illustration of a method in accordance with embodiments of the present invention.

In FIG. 3, a schematic illustration of a method for determining and assigning the locking position of comments based on the comment's position in a media stream in accordance with embodiments of the present invention is shown. Various steps of a particular method according to embodiments of the present invention are illustrated. In alternate embodiments, the method may have additional or fewer steps. One of ordinary skill in the art would appreciate that the method may be operable with a number of optional steps, and embodiments of the present invention are contemplated for use with any such optional steps.

Traditionally, a computer program consists of a finite sequence of computational instructions or program instructions. It will be appreciated that a computing device can receive such a computer program and, by processing the computational instructions thereof, produce a further technical effect.

A computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer, network of computers, or system, to produce one or more particular machine/system that can perform any and all of the functions and/or method steps described or depicted herein. The particular machine or machines, as part of the system, provide a means for carrying out any and all of the functions of the system and/or the method steps described or depicted herein.

Any combination of one or more computer readable medium(s) may be utilized, for example to store and/or transfer instructions that implement the method of the present invention, and thus convert a general purpose computer or system into a specialized computer or system that carries out any and all of the depicted functions and/or method steps. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. The data store may be a relational database, working in conjunction with a relational database management system (RDBMS) for receiving, processing and storing data. Alternatively or additionally, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture or product including computer-readable instructions for implementing any and all of the functions and methods described or depicted herein.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus or system. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict apparatuses (i.e., systems) and methods, and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems and methods, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for locking social network user comments to positions in a media stream, the system comprising the following system components:
a network server configured to stream media to a plurality of client computing devices;
a client computing device which comprises a graphical user interface (GUI) configured to allow a user to communicate with the network server;
a data store configured to store user data, user comments and comment-related data;
a communications means configured to allow exchange of data between server and client computing device;
and a comment lock module configured to determine and assign a locking position to each comment;
wherein the system components are operably connected and are configured to:
providing a media stream to a plurality of users;
receive a comment from one or more user at a specific position of the media stream;
automatically tag each comment to its corresponding position within the media stream;
automatically determine and assign a locking position for each comment;
automatically generate a comment indication for users watching the media stream that indicates that a comment is tagged to a position in the media stream, the comment indication comprising a locking indication,
wherein said locking indication comprises a visual identifier that identifies the type of comment,
wherein the type of comment is selected from the group consisting of a voice comment, a text comment and a video comment,
wherein the visual identifier for each type of comment is visually distinguishable from another visual identifier for a second type of comment;
automatically determine whether the watching user's current or past position in the media stream has passed the locking position for a comment;
automatically restrict the viewing of the comment's content until the locking position is passed by the watching user;
automatically provide the watching user with one or more option for unrestricted viewing of the comment once the watching user has passed the locking position,
wherein the GUI comprises one or more option for a user to send a link or attached file of a media stream item or content thereof to another user, and the link or file optionally is selected from a filtered category option that comprises Love, Inspirational, Hope, Laughter, and Gratitude.

2. The system of claim 1, wherein the comment lock module's determination and assignment of the locking position comprises an automatic evaluation of the comment content, the automatic evaluation optionally comprising comparing keywords in the comment content with keyword categories in the data store.

3. The system of claim 2, wherein the system further comprises an AI module, and wherein the automatic evaluation of the comment content comprises evaluation of the comment content by the AI module.

4. The system of claim 3, wherein the automatic evaluation of the comment content by the AI module comprises the entry of the locking position or locking position related data by one or more individuals, the one or more individuals selected from the group comprising: commenting user, user, group of users, group of users selected by profile characteristics, group of users with comment lock privileges, moderator, forum moderator, administrator.

5. The system of claim 4, wherein the GUI is configured to provide the individual with selectable options to indicate the position that a comment should be locked to.

6. The system of claim 1, wherein the GUI comprises a navigation tool configured with user-selectable options for navigating to and between comment tags and comment locking positions within the data stream.

7. The system of claim 1, wherein the GUI comprises a navigation tool configured to allow a user to jump to the positions in the media stream to which a comment is tagged to or to its locking position, and upon selection of the comment, display the comment and optionally the media stream starting from the tagged position or the locking position.

8. The system of claim 1, wherein the GUI comprises selectable options for a user to restrict comment notifications while consuming a media stream to one or more options, the options including no notifications, notifications from one or more selected individual user, and notifications from one or more group of users.

9. The system of claim 1, wherein the content is filtered based on content categories or content similarities to content of positive categories, and wherein the positive categories one or more of Love, Inspirational, Hope, Laughter, and Gratitude.

10. The system of claim 1, wherein the GUI comprises one or more option for a user to send a link or attached file of a media stream item or content thereof to another user, and the link or file optionally is selected from a filtered category option that comprises Love, Inspirational, Hope, Laughter, and Gratitude.

11. A computer-implemented method for locking social network user comments to positions in a media stream, wherein each step of the method is performed by a system of operably connected components, and wherein the system components comprise: a network server configured to stream media to a plurality of client computing devices; a client computing device which comprises a graphical user interface (GUI) configured to allow a user to communicate with the network server; a data store configured to store user data, user comments and comment-related data; a communications means configured to allow exchange of data between server and client computing device; and a comment lock module configured to determine and assign a locking position to each comment; and wherein the method steps comprise:

provoking a media stream to a plurality of users;

receiving a comment from one or more user at a specific position of the media stream;

automatically tagging each comment to its corresponding position within the media stream;

automatically determining and assigning a locking position for each comment;

automatically generating a comment indication for users watching the media stream that indicates that a comment is tagged to a position in the media stream, the comment indication comprising a locking indication, wherein said locking indication comprises a visual identifier that identifies the type of comment, wherein the type of comment is selected from the group consisting of a voice comment, a text comment and a video comment, wherein the visual identifier for each type of comment is visually distinguishable from another visual identifier for a second type of comment;

automatically determining whether the watching user's current or past position in the media stream has passed the locking position for a comment;

automatically restricting the viewing of the comment's content until the locking position is passed by the watching user;

automatically providing the watching user with one or more option for unrestricted viewing of the comment once the watching user has passed the locking position, wherein the GUI comprises one or more option for a user to send a link or attached file of a media stream item or content thereof to another user, and the link or file optionally is selected from a filtered category option that comprises Love, Inspirational, Hope, Laughter, and Gratitude.

12. The method of claim 11, wherein determining and assigning of the locking position comprises an automatic evaluation of the comment content by the comment lock module, the automatic evaluation of the comment content optionally comprising comparing keywords in the comment content with keyword categories in the data store.

13. The method of claim 12, wherein the system further comprises an AI module, and the automatic evaluation of the comment content comprises evaluation of the comment content by the AI module.

14. The method of claim 13, wherein the automatic evaluation of the comment content by the AI module comprises the entry of the locking position or locking position related data by one or more individuals, the one or more individuals selected from the group comprising: commenting user, user, group of users, group of users selected by profile characteristics, group of users with comment lock privileges, moderator, forum moderator, administrator.

15. The method of claim 14, the method further comprising the step of providing an individual with selectable options to indicate the position that a comment should be locked to by the GUI of the system.

16. The method of claim 11, the method further comprising the step of providing a user with a navigation tool configured with user-selectable options for navigating to and between comment tags and comment locking positions within the data stream.

17. The method of claim 11, the method further comprising the step of providing a navigation tool configured to allow a user to jump to the positions in the media stream to which a comment is tagged to or to its locking position, and upon selection of the comment, displaying the comment and optionally the media stream starting from the tagged position or the locking position.

18. The method of claim 11, wherein the GUI comprises selectable options for a user to restrict comment notifications while consuming a media stream to one or more options, the options including no notifications, notifications from one or more individual user, and notifications from one or more group of users.

19. The method of claim 11, wherein the content is filtered based on content categories or content similarities to content of positive categories, and wherein the positive categories one or more of Love, Inspirational, Hope, Laughter, and Gratitude.

* * * * *